(12) United States Patent
Seidel et al.

(10) Patent No.: US 12,365,324 B2
(45) Date of Patent: Jul. 22, 2025

(54) BRAKE SYSTEM WITH NOISE-OPTIMIZED VALVE CONTROL

(71) Applicant: Continental Automotive Technologies GmbH, Hannover (DE)

(72) Inventors: Anne Seidel, Bad Homburg v. d. Höhe (DE); Holger Kollmann, Rodgau (DE); Christian Courth, Frankfurt (DE)

(73) Assignee: Continental Automotive Technologies GmbH, Hannover (DE)

( * ) Notice: Subject to any disclaimer, the term of this patent is extended or adjusted under 35 U.S.C. 154(b) by 157 days.

(21) Appl. No.: 18/254,854

(22) PCT Filed: Oct. 21, 2021

(86) PCT No.: PCT/DE2021/200159
§ 371 (c)(1),
(2) Date: May 27, 2023

(87) PCT Pub. No.: WO2022/111768
PCT Pub. Date: Jun. 2, 2022

(65) Prior Publication Data
US 2023/0415723 A1 Dec. 28, 2023

(30) Foreign Application Priority Data
Nov. 27, 2020 (DE) ............. 10 2020 214 971.2

(51) Int. Cl.
*B60T 13/68* (2006.01)
*B60T 8/36* (2006.01)
(52) U.S. Cl.
CPC ........... *B60T 13/686* (2013.01); *B60T 8/366* (2013.01)

(58) Field of Classification Search
CPC ...... B60T 8/366; B60T 8/3655; B60T 8/4086; B60T 13/686; B60T 13/662; B60T 13/168; B60T 7/042
See application file for complete search history.

(56) References Cited

U.S. PATENT DOCUMENTS 4,482,190 A * 11/1984 Burgdorf ............... B60T 8/266
303/114.1
4,708,404 A * 11/1987 Seibert .................. B60T 13/161
303/114.1

(Continued)

FOREIGN PATENT DOCUMENTS

| DE | 3838353 A1 | 5/1990 |
| DE | 102006057023 A1 | 6/2008 |
| DE | 102008014538 A1 | 5/2009 |

OTHER PUBLICATIONS

German Search Report dated Jul. 26, 2021 for the counterpart German Patent Application No. 10 2020 214 971.2.

(Continued)

*Primary Examiner* — Hai H Huynh
*Assistant Examiner* — Johnny H Hoang

(57) ABSTRACT

A brake system for a motor vehicle comprises a hydraulic line system with at least one normally closed hydraulic valve, wherein a final stage is provided for electrically actuating the at least one hydraulic valve. To minimize noise emissions, the final stage is a final stage with analog control and a computing unit is provided which is configured to determine a valve current based on a pressure difference across the hydraulic valve and to actuate the final stage to make the valve current available at the hydraulic valve.

9 Claims, 4 Drawing Sheets

(56) References Cited

U.S. PATENT DOCUMENTS

| | | | | |
|---|---|---|---|---|
| 4,720,151 | A * | 1/1988 | Belart | B60T 8/445 |
| | | | | 303/122.1 |
| 9,016,804 | B2 * | 4/2015 | Linhoff | B60T 8/5081 |
| | | | | 303/3 |
| 2008/0284242 | A1 * | 11/2008 | Ganzel | B60T 8/4077 |
| | | | | 303/114.1 |
| 2009/0026397 | A1 | 1/2009 | Evers | |
| 2010/0121548 | A1 * | 5/2010 | Muller | B60T 13/686 |
| | | | | 701/77 |
| 2013/0169032 | A1 * | 7/2013 | Linhoff | B60T 8/5081 |
| | | | | 303/3 |
| 2015/0175146 | A1 * | 6/2015 | Quirant | B60T 7/042 |
| | | | | 303/14 |
| 2015/0219227 | A1 | 8/2015 | Risla | |
| 2022/0373096 | A1 * | 11/2022 | Lenz | F16K 1/14 |

OTHER PUBLICATIONS

The International Search Report and the Written Opinion of the International Searching Authority mailed on Feb. 1, 2022 for the counterpart PCT Application No. PCT/DE2021/200159.

* cited by examiner

BRAKE SYSTEM WITH NOISE-OPTIMIZED VALVE CONTROL

TECHNICAL FIELD

The embodiments relate to a brake system for a motor vehicle having a hydraulic line system with at least one normally closed hydraulic valve, wherein a final stage is provided for electrically actuating the at least one normally closed hydraulic valve.

BACKGROUND

Motor vehicle brake systems typically have a brake fluid reservoir from which at least one wheel brake is supplied by means of a pressurization device for providing hydraulic pressure, such as a hydraulic pump or a linear actuator. The hydraulic line system in this case connects at least the brake fluid reservoir, the wheel brakes and the pressurization device. Brake systems of this type also have a large number of hydraulic valves in the hydraulic line system to distribute the generated brake pressure to the individual wheel brakes and to implement assistance and safety functions. Depending on the intended purpose, the hydraulic valves are designed to be partly normally open and partly normally closed. Normally closed valves typically have a mechanical spring that presses a valve plunger against a valve seat and thus keeps the valve closed.

Important normally closed valves are for example the outlet valves of the wheel brakes, which can be opened to reduce wheel pressure, for example in an ABS control system. Up to now, these have been actuated by means of a digital final stage, which can only set the two states of valve voltage on and valve voltage off. In the switched-on state, a valve current is set here that is dependent on the currently applied on-board voltage and the currently provided resistance of the valve control chain and the coil. The resistance and the valve current are therefore also temperature-dependent. When the normally closed valve is switched off, the current is reduced to 0. In order to set a desired flow rate through the outlet valve, it is operated in pulsed mode.

The normally closed valves must be designed here in such a way that even a valve with a limit position, at high pressure, which can be up to 225 bar, can switch a high electrical resistance due to a high temperature and a particularly low on-board voltage of up to 9V. This means that, in the vast majority of cases, i.e., with an average valve, rather low to medium hydraulic pressures and a normal voltage of the on-board power supply, the valves are thus switched on with a very large energy surplus, which leads to a clearly audible switching noise. When the valve is switched off, an armature of the valve is accelerated by the closing spring force. This also results in clearly audible noise emissions due to the unbraked impact of the armature on the valve seat. Particularly in the case of one-box systems, in which the brake master cylinder is located in a single housing together with the hydraulic valves, the brake system must be mounted directly behind the bulkhead of the vehicle. This allows the structure-borne noise to be transmitted directly, so that the noise is perceived more strongly by the driver. The excess energy of the armature also causes increased wear of the hydraulic valve.

SUMMARY

A motor vehicle comprises a hydraulic line system with at least one normally closed hydraulic valve, wherein a final stage with analog control is provided for electrically actuating the at least one hydraulic valve. For actuating the analog final stage, a computing unit is provided which is set up to determine a valve current based on a pressure difference across the hydraulic valve. The final stage is controlled accordingly to provide the determined valve current at the hydraulic valve. For this purpose, the final stage can be designed to be current-controlled.

By actuating the normally closed valve according to demand, the excess energy of the valve armature is reduced and thus the impact speed of the armature on the magnet core is minimized. This results in both reduced noise emission and reduced wear of the valve.

In an embodiment, the computing unit is configured to determine a counterforce for opening the hydraulic valve at least from a spring force of the hydraulic valve and the pressure difference across the hydraulic valve. The counterforce is the force acting on the armature of the hydraulic valve when no current flows through the coil of the valve. From the counterforce, the computing unit can then determine an opening force that is greater than the counterforce by a predetermined amount and can further determine an associated valve opening current from the opening force. The final stage is then actuated by the computing unit to provide the associated valve opening current when the hydraulic valve is switched on. Since the counterforce for the respective current state of the valve and the brake system is determined by the computing unit and used to determine the valve current, a valve current can be provided as required. It is therefore not necessary to open the hydraulic valve with a large energy surplus to ensure safe opening in all possible situations.

In another embodiment, the brake system is configured to determine a closing force for closing the hydraulic valve that is smaller than the counterforce by a predetermined amount. An associated valve closing current is then determined from the closing force, and the final stage is actuated to provide the associated valve closing current when the valve is switched off. In this way, the energy surplus and thus the noise emission is also reduced when the hydraulic valve closes.

In a embodiment, the final stage is configured to provide current pulses at the hydraulic valve in order to open the valve for a short time in each case, wherein the current pulses have in particular a length of 10 ms to 1000 ms, for example 10 to 100 ms. Since normally closed valves cannot be stably set to an intermediate state, between a fully closed state and a fully open state, in the typical installation direction in which the wheel pressure acts to close, they are operated in a pulsed manner to achieve a desired flow rate averaged over time. In the opposite installation direction, in which the wheel pressure acts against the closing spring force, normally closed valves could be stably set, but then a very strong spring would have to be installed in the valve to close against the maximum wheel pressure in all limit positions. This, in turn, would require a very strong coil to open the valve at all. Such a system would therefore be large, heavy and expensive. Even with the actuation of the hydraulic valve by means of an analog final stage, the valve is therefore operated in a pulsed manner, switching back and forth between the valve opening current and the valve closing current. Alternatively, it is possible to switch between the valve opening current and zero.

In an embodiment, the length of the current pulses is adjusted based on the valve current, so that the flow rate through the valve corresponds to the flow rate at a maximum valve current. Thus, the flow rate through the valve is identical to that when actuated with a digital final stage, as is known from the prior art, but the noise emission is significantly reduced.

In another embodiment, the hydraulic valve is an outlet valve of a wheel brake of the brake system. The outlet valve of the wheel brake is actuated during automatic assistance functions, for example during ABS control, in order to reduce the pressure in the wheel brakes. The noise reduction makes it possible to implement the automatic intervention in a manner unnoticed by the driver of the motor vehicle.

In another embodiment, the predetermined amount is based at least on valve and/or coil tolerances. The more precisely the characteristics of the hydraulic valve are known, the smaller the amount can be selected and thus the noise emission can be further reduced.

In a further embodiment, the hydraulic valve has a residual air gap in the energized state. For this purpose, the valve can have, for example, a spacer disc between the armature and the magnet core. The residual air gap reduces the electromagnetic force on the armature of the hydraulic valve, thus minimizing the energy surplus and noise emission.

In a further embodiment, the hydraulic valve is arranged in a housing with the brake master cylinder. Accordingly, the brake system is formed as a one-box system.

The object is additionally achieved by a method for controlling a normally closed hydraulic valve in a brake system, in particular a brake system described above, having the steps of: determining a valve current based on the pressure difference across the hydraulic valve, providing the determined valve current by means of a final stage with analog control.

In a embodiment of the method, the following steps are performed: calculating a counterforce from at least a spring force of the hydraulic valve and the pressure difference across the hydraulic valve, calculating from the counterforce a switching force that is greater or less than the counterforce by a predetermined amount, calculating the associated valve switching current from the switching force.

BRIEF DESCRIPTION OF THE DRAWINGS

Further features, advantages and possible applications can also be found in the description below of exemplary embodiments and the drawings. All of the features described and/or pictorially depicted belong to the subject matter of the invention both individually and in any combination, also independently of their summarization in the claims or the back-references thereof.

DETAILED DESCRIPTION

Figure 1:
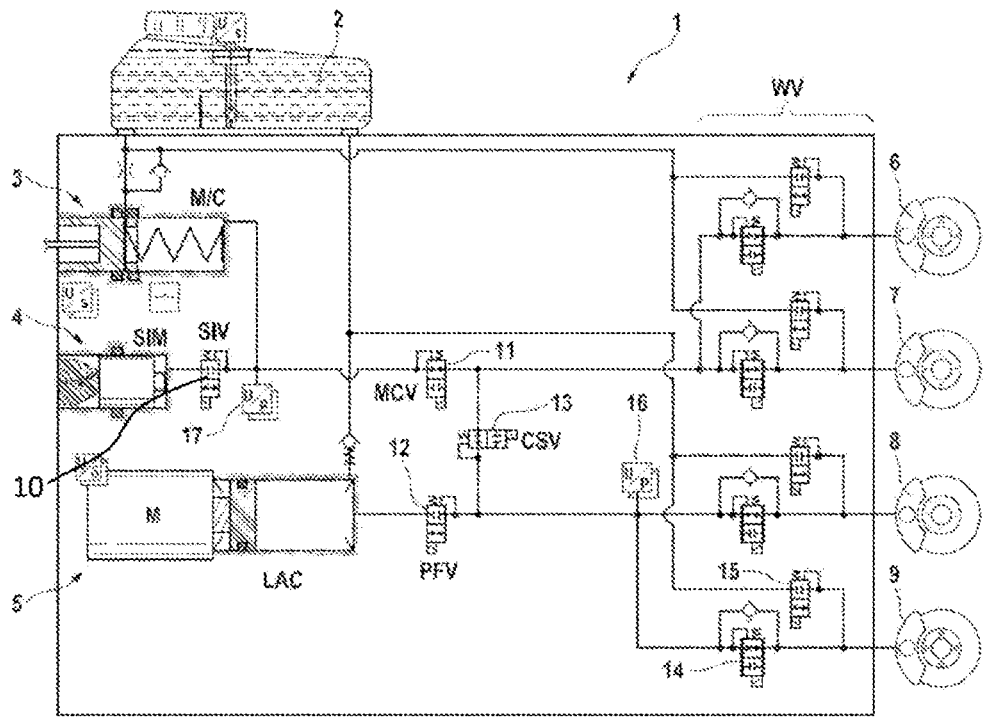
FIG. 1 schematically shows a brake system.

FIG. 1 shows a brake system, in which four wheel brakes 6, 7, 8, 9 are supplied with brake fluid from a brake fluid reservoir 2. The brake system is formed as a brake-by-wire system. For this purpose, a brake master cylinder 3 is provided which displaces brake fluid into a simulator 4 via an open simulator valve 10. In normal operation, the brake master cylinder 3 is separated from the wheel brakes 6, 7, 8, 9 by a closed master cylinder valve 11. Based on the pedal travel and the brake master cylinder pressure, which is determined by a pressure sensor 17, a linear actuator 5 is actuated. This generates a hydraulic pressure, which is fed through an open supply valve 12 to the individual wheel brakes 6, 7, 8, 9. In normal operation, a circuit isolating valve 13 is opened so that both the wheel brakes 6, 7 of the front axle and the wheel brakes 8, 9 of the rear axle are supplied with the hydraulic pressure. Each of the wheel brakes 6, 7, 8, 9 is equipped with an inlet valve 14 and an outlet valve 15. The outlet valves 15 are connected to an analog final stage so that they can be actuated with a variable switching current as required.

Figure 2:
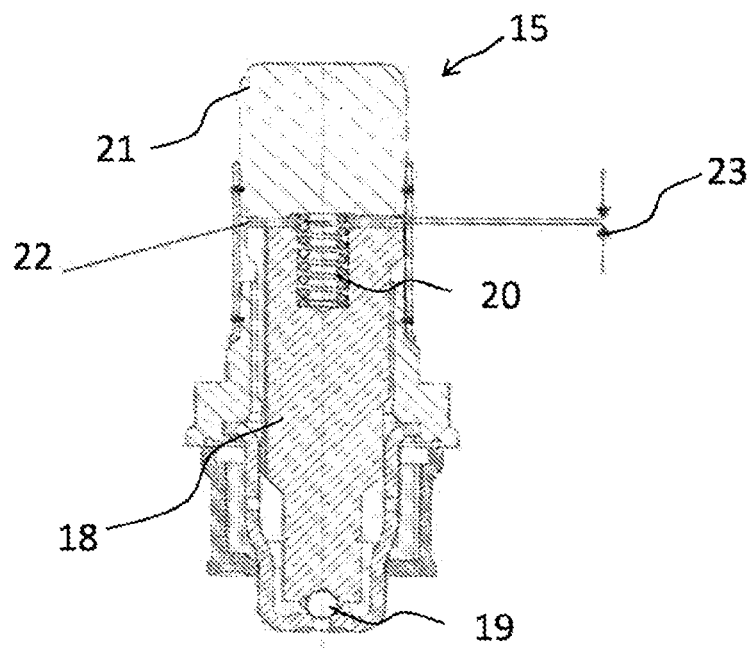
FIG. 2 schematically shows an outlet valve of the brake system of FIG. 1.

FIG. 2 shows, by way of example, an outlet valve 15 of the brake system 1. In the outlet valve 15, an armature 18 or valve plunger presses against a valve seat 19 to close the outlet valve hydraulically. In the process, a spring 20 exerts a spring force on the armature 18 to secure the outlet valve 15 in the closed state when de-energized. The armature 18 can move by a lift travel 23 toward a magnet core 21 to open the outlet valve 15. In the fully open state, the hydraulic valve 15 still has a residual air gap 22. For this purpose, for example, a spacer disc can be provided between the magnet core 21 and the armature 18.

To switch the outlet valve 15, it has an electric coil which is supplied with current by a final stage. This generates a magnetic field which acts on the armature 18 and produces an electromagnetic force on it. The magnitude of the electromagnetic force depends on the one hand on the electric current through the coil of the outlet valve 15 and on the other hand on the distance between the electric coil with magnet core and the armature 18.

Figure 3:
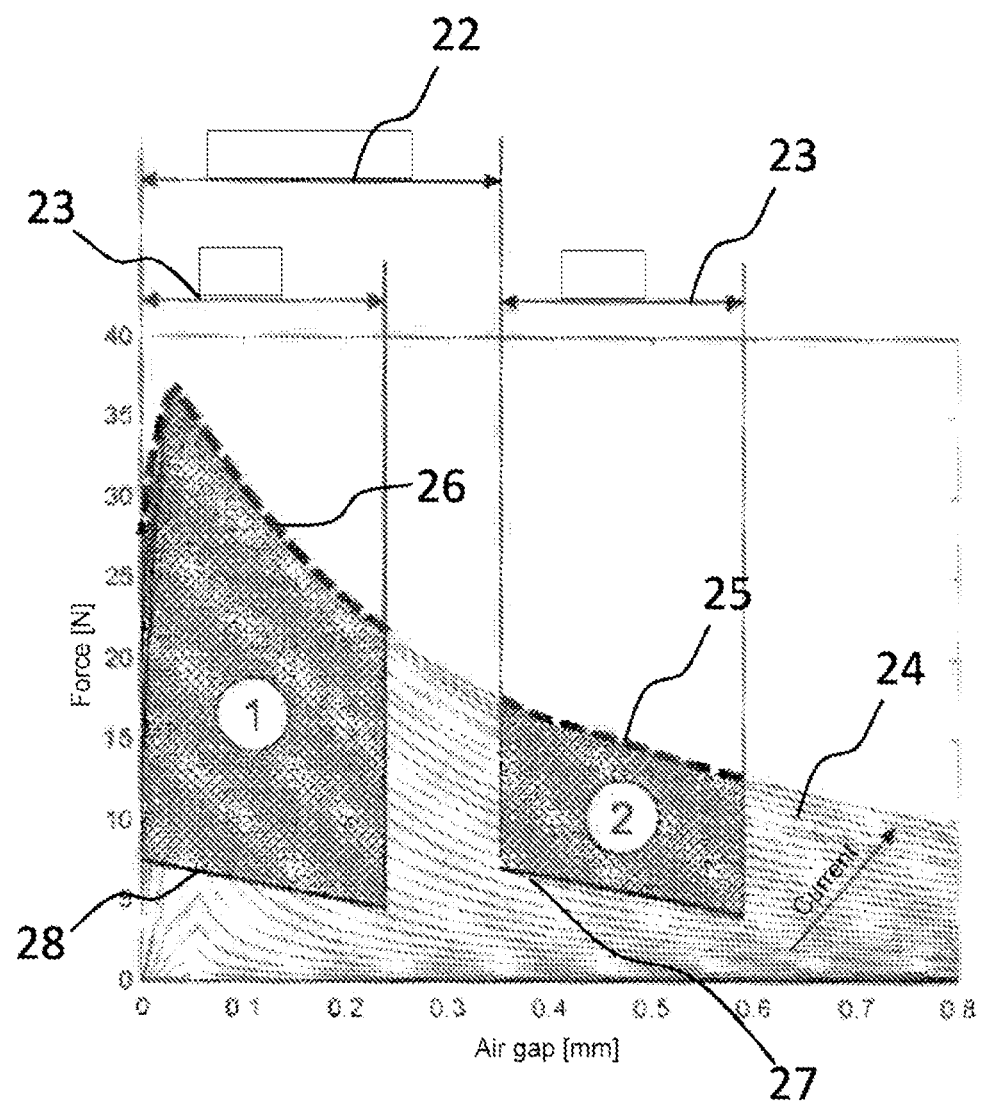
FIG. 3 shows a graph with valve forces depending on different switching currents.
Figure 4:
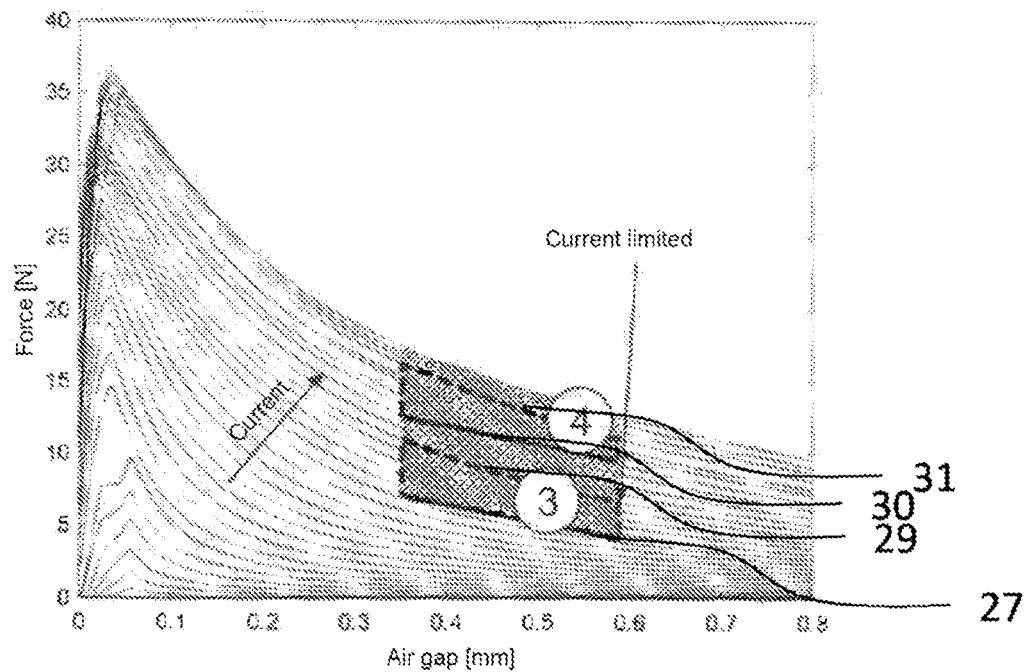
FIG. 4 shows a graph with switching currents for the analog actuation of the final stage, when the valve is opened.

The relationship between the force and these variables is shown in the form of a set of curves 24 in FIG. 3. The electromagnetic force increases with increasing current, and the curves further above therefore represent the forces at higher currents. If the outlet valve 15 is now digitally actuated, as is common in the prior art, a maximum current is always provided by the final stage, which is shown as the uppermost curve in FIG. 3.

For an outlet valve 15 without a residual air gap, the electromagnetic force is therefore given by the dashed curve portion 26, which runs between an air gap of 0 and 0.25 mm. In the case of an outlet valve 15 formed with a residual air gap 22, the marked curve portion 25 results, which runs at lower forces due to the greater distance between the magnetic-field-generating coil of the outlet valve 15 and the armature 18. In addition to the electromagnetic forces 25, 26, respective counterforces 27, 28 also act on the armature 18 and result mainly from the spring force of the spring 20 and the pressure difference across the hydraulic valve 15.

The impact energy when switching on corresponds to the area between the magnetic force and the closing force (spring force of the valve plus pressure force) in the force-displacement diagram. If the outlet valve 15 is now switched, the integral between the curves 26 and 28 results in the energy with which the valve plunger 18 impacts on the magnet core 21 in the case without a residual air gap. In addition to the high noise level, this also leads to high wear. The design with residual air gap results in a somewhat lower amount of energy, which is derived from the integral between the curves 25 and 27. However, this amount of energy is still very high and thus also leads to high noise generation and heavy wear of the outlet valve 15.

It is now provided to control the outlet valve 15 by means of an analog final stage. For this purpose, based on the current pressure difference across the hydraulic valve 15 and the spring force of the outlet valve 15, the current counterforce 27 is determined, which must be overcome to open the valve. From this, an opening force 29 can be determined which is greater than the counterforce 27 by a predetermined amount. To open the outlet valve 15, a current is now provided with which the desired opening force 29 can be generated. As explained above, the excess energy of the valve plunger 18 results from the integral between the curves 29 and 27. Since the analog and thus reduced actuation of the outlet valve 15 means that the curves 29 and 27 are much closer to each other than in the case of digital actuation, there is less energy surplus. This means that both noise generation and wear of the outlet valve can be greatly reduced.

If there is a greater pressure difference across the outlet valve 15, this results in a much greater counterforce 30, which keeps the hydraulic valve in the closed state. If, in this state, the valve were also to be supplied with the same valve current as at a lower pressure difference, only the electromagnetic force 29 would result, which is insufficient to open the hydraulic valve against the counterforce 30. However, since the valve current is selected as required based on the pressure difference and thus the current counterforce 30, the result is an opening force 31 which, as in the previous case, is greater than the counterforce 30 by the predetermined amount. Safe opening of the outlet valve is thus ensured in the case of any pressure difference.

Figure 5:
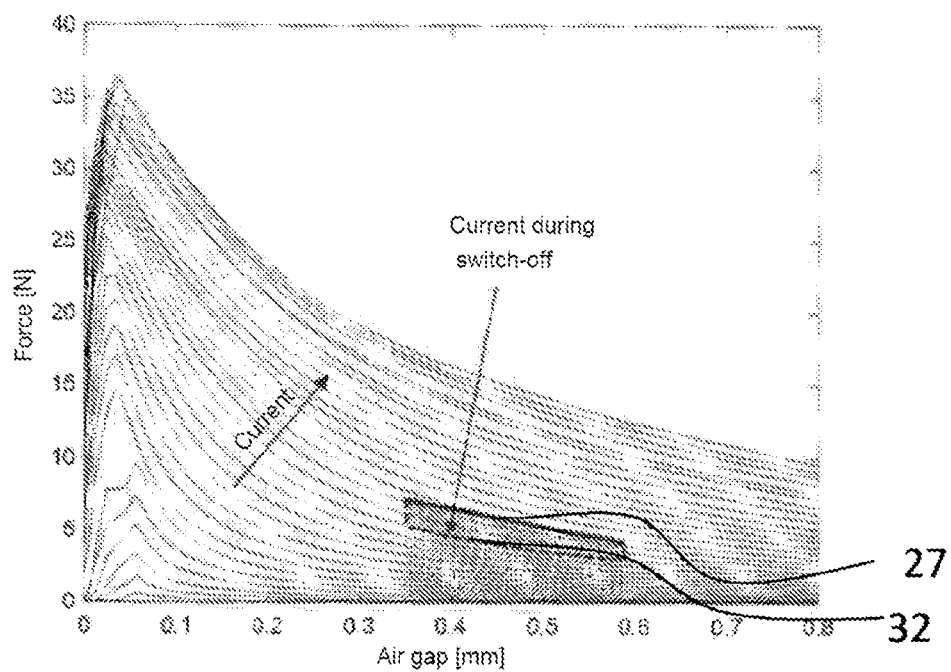
FIG. 5 shows a graph with switching currents for the analog actuation of the final stage, when closing the valve.

The behavior when the valve closes is now shown in FIG. 5. With the digital final stage provided in the prior art, the valve current can only be reduced to when the valve closes. Accordingly, an excess energy of the armature 18 results from the integral of the counterforce 27. This energy also leads to a high speed of the armature 18 and thus to a strong noise development and wear of the outlet valve when the valve plunger 18 impacts against the valve seat 19. A current is now provided which generates an electromagnetic force 32 which is lower than the counterforce 27 by a predetermined amount. The excess energy of the valve plunger 18 therefore results only from the integral between the curves 27 and 32. Consequently, both noise development and wear of the outlet valve 15 are also reduced during closing.

Figure 6:
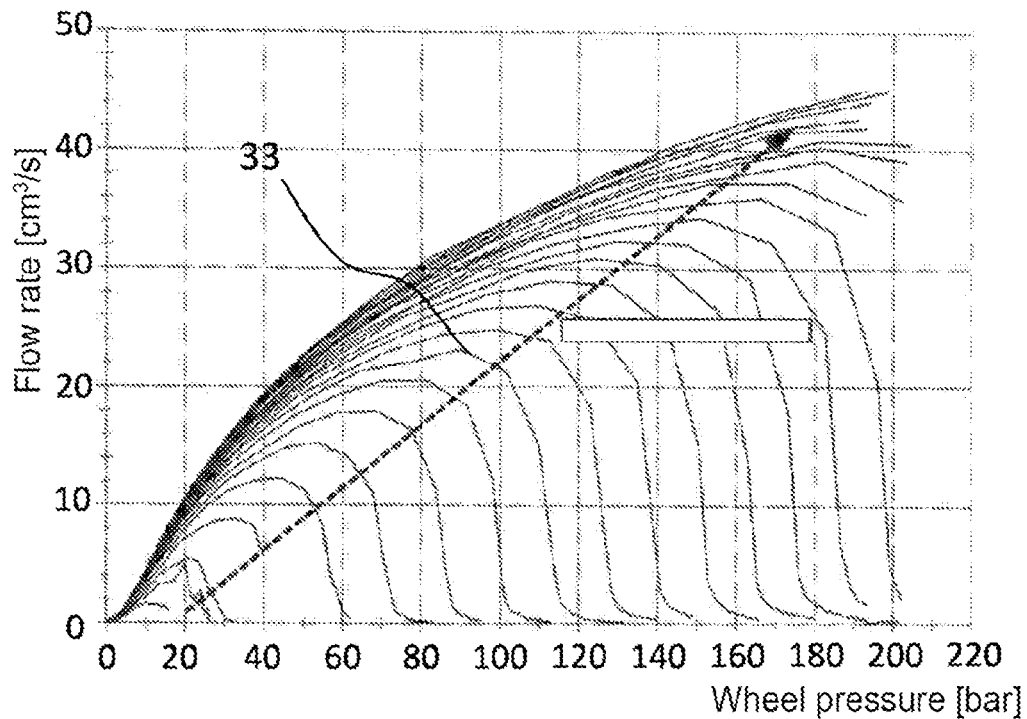
FIG. 6 shows a graph with flow rate curves.

The outlet valve 15 is typically actuated by means of successive current pulses which briefly open and close the outlet valve 15 several times in succession. The flow rate 33 through the hydraulic valve during a current pulse is dependent on the one hand on the length of the pulse but also for example on the pressure difference across the hydraulic valve and the valve current during the pulse. FIG. 6 shows a set of curves which illustrates the relationship between the pressure difference across the hydraulic valve and the flow rate 33 occurring in the case of a fixed pulse length for various valve currents. It can be seen here that the curves are close together in the upper range. Accordingly, a slight reduction in the valve current for noise minimization, as provided, results in only a slightly reduced flow rate. This can be compensated for by a somewhat longer pulse duration.

Figure 7:
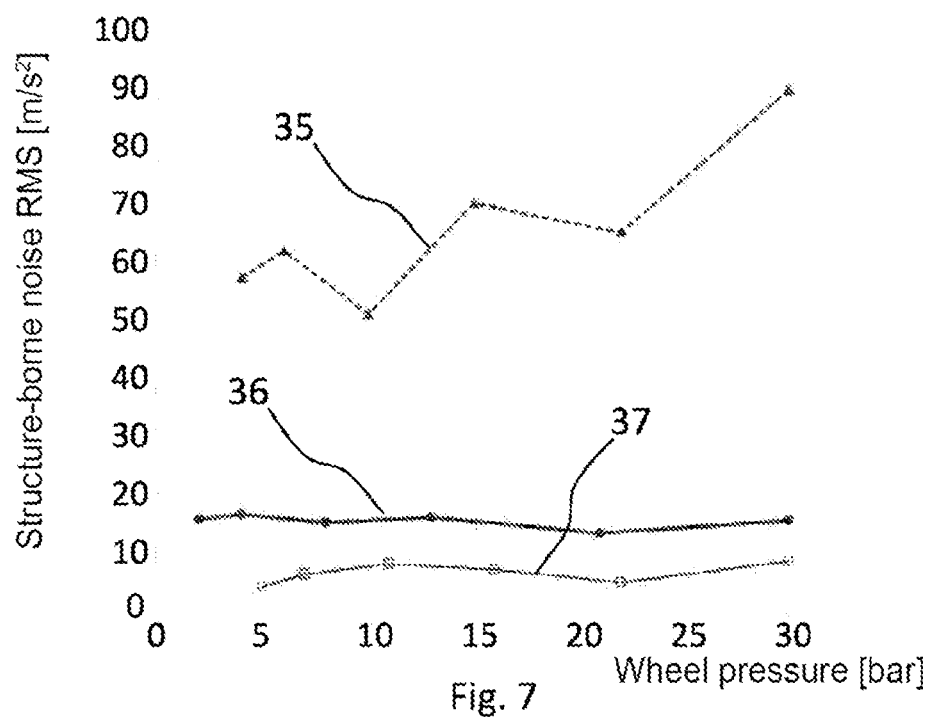
FIG. 7 shows a graph with noise emissions.

As shown in FIG. 7, the noise generated when switching the outlet valve can be greatly reduced by the method. The curve 35 shows measurements of structure-borne noise for various wheel pressures for a hydraulic valve without a residual air gap, which is digitally controlled as known from the prior art. The use of a hydraulic valve with residual air gap already leads to a strong reduction in noise. Digital actuation of such a valve results in the structure-borne noise shown in curve 36. The analog actuation of the outlet valve 15 with a valve current leads to a drastic reduction in noise development, which is shown in the curve 37.

The invention claimed is:

1. A brake system for a motor vehicle comprising:
   a hydraulic line system with at least one hydraulic valve which is normally closed;
   an electric coil which is supplied with current by a final stage having analog control is provided for electrically actuating the at least one hydraulic valve; and
   a computing unit is-provided-which is configured to:
      determine a counterforce at least from a spring force of the hydraulic valve and the pressure difference across the hydraulic valve;
      determine from the counterforce an opening force which is greater than the counterforce by a predetermined amount:
      determine an associated valve opening current from the opening force; and
      actuate the final stage when the hydraulic valve is switched on to provide the associated valve opening current.

2. The brake system as claimed in claim 1, wherein the computing unit to close the hydraulic valve:
   determines a closing force which is smaller than the counterforce by a predetermined amount;
   determines an associated valve closing current from the closing force; and
   actuates the final stage when the hydraulic valve is switched off to provide the associated valve closing current.

3. The brake system as claimed in claim 1, wherein the final stage is configured to provide current pulses at the hydraulic valve in order to open the hydraulic valve for a predetermined time, wherein the current pulses have a length of 10 ms to 1000 ms.

4. The brake system as claimed in claim 3, wherein the length of the current pulses is adjusted based on the valve current, so that a flow rate through the hydraulic valve corresponds to the flow rate at a maximum valve current.

5. The brake system as claimed in claim 1, wherein the hydraulic valve is an outlet valve on a wheel brake of the brake system.

6. The brake system as claimed in claim 1, wherein the predetermined amount is based at least on valve and/or coil tolerances.

7. The brake system as claimed in claim 1, wherein the hydraulic valve has a residual air gap in an energized state.

8. The brake system as claimed in claim 1, wherein the hydraulic valve is arranged in a housing with a brake master cylinder.

9. A method for controlling a hydraulic valve, which is normally closed, in a brake system comprising:
   determining a pressure difference across a hydraulic valve:
   calculating a counterforce from at least a spring force of the hydraulic valve and the pressure difference across the hydraulic valve;
   calculating from the counterforce a switching force, wherein the counterforce is one of greater and less than the counterforce by a predetermined amount; and
   calculating a valve current from the switching force; and
   providing the valve current with a final stage that has analog control.

* * * * *